(12) United States Patent
Norton

(10) Patent No.: US 6,968,263 B1
(45) Date of Patent: **\*Nov. 22, 2005**

(54) VEHICLE OCCUPANT PRESENCE AND POSITION SENSING SYSTEM

(76) Inventor: Peter Norton, P.O. Box 62, Northville, MI (US) 48167

( * ) Notice: Subject to any disclaimer, the term of this patent is extended or adjusted under 35 U.S.C. 154(b) by 0 days.

This patent is subject to a terminal disclaimer.

(21) Appl. No.: 10/602,031

(22) Filed: Jun. 23, 2003

Related U.S. Application Data

(63) Continuation-in-part of application No. 09/911,251, filed on Jul. 23, 2001, now Pat. No. 6,584,387, which is a continuation-in-part of application No. 09/218,231, filed on Dec. 22, 1998, now Pat. No. 6,292,727, which is a continuation-in-part of application No. 08/660,834, filed on Jun. 10, 1996, now abandoned, which is a continuation of application No. 08/359,947, filed on Dec. 20, 1994, now abandoned, which is a continuation of application No. 08/157,380, filed on Nov. 23, 1993, now abandoned.

(51) Int. Cl.$^7$ .............................. G06F 7/00
(52) U.S. Cl. .................. 701/45; 701/46; 280/728.1
(58) Field of Search ............... 701/45, 46; 280/728.1, 280/735; 307/9.1; 180/271, 274, 282

(56) References Cited

U.S. PATENT DOCUMENTS

| | | | |
|---|---|---|---|
| 5,865,463 A * | 2/1999 | Gagnon et al. | 280/735 |
| 6,292,727 B1 * | 9/2001 | Norton | 701/45 |
| 6,584,387 B1 * | 6/2003 | Norton | 701/45 |

OTHER PUBLICATIONS

Walter Kidwell, electrical instruments and measurements 1969, pp. 322-329, pub. by McGraw Hill, New York.

* cited by examiner

*Primary Examiner*—Yonel Beaulieu

(57) ABSTRACT

The invention characterizes a seat occupant. Sensors in the seat determine the position of a seat occupant relative to the seat. The position of the seat relative to the vehicle combined with the position of the seat occupant relative to the seat determines the location of the seat occupant relative to the vehicle. The seat occupant is characterized by the magnitude and Q of capacitance between electrodes in the seat and other indications. Situations wherein airbag deployment is not desired are identified. The position of the occupant relative to the seat, the weight of the seat occupant, whether the seat belt is latched, the track position and recline angle of the vehicle seat and vehicle deceleration during a crash are combined with capacitance and other measurements to estimate the position of the occupant relative to a possible deploying airbag as the occupant moves toward the airbag during a crash.

44 Claims, 2 Drawing Sheets

VEHICLE OCCUPANT PRESENCE AND POSITION SENSING SYSTEM

This is a continuation-in-part of application Ser. No. 09/911,251 filed Jul. 23, 2001 for "Vehicle Occupant Presence and Position Sensing System", now matured into U.S. Pat. No. 6,584,387, which is a continuation-in-part of application Ser. No. 09/218,231 filed Dec. 22, 1998 for "Vehicle Occupant Presence and Position Sensing System", now matured into U.S. Pat. No. 6,292,727, which is a continuation-in-part of application Ser. No. 08/660,834 filed Jun. 10, 1996 for "Occupant Position Sensing System", now abandoned, which is a continuation of application Ser. No. 08/359,947 filed Dec. 20, 1994 for "Occupant Position Sensing System", now abandoned, which is a continuation of application Ser. No. 08/157,380 filed Nov. 23, 1993 for "Occupant Sensing System", now abandoned.

FIELD OF THE INVENTION

This invention relates to systems for determining if a vehicle seat is occupied by a person and, if so, insuring that the air bag will protect the person during a collision as well as possible.

BACKGROUND OF THE INVENTION

An air bag comprises an inflatable bag and means for inflating the bag. Air bags are highly desired life saving devices that have performed well in many accidents and saved many lives. However, the bag must be inflated in a very brief time such as 1/30 of a second that requires rapid movement of the bag from a stored and compacted state to a fully inflated state. The rapid deployment of the bag involves great force. A deploying bag can injure a person during the early phases of deployment if the person is very close to where the airbag is stored. Another hazardous situation is when the occupant is a baby in a rear-facing baby seat. It is also desired to inhibit deployment if there is no person in the seat. Much effort has gone into developing systems for characterizing the occupant and ascertaining the occupant position to meet this need. Proposed systems attempt to ascertain the distance from the inflator to the seat occupant and systems using sonic and optical ranging for that purpose are well known. These systems are deficient in that they cannot reliably distinguish between an occupant and other things such as road maps, beverage cups, packages and voluminous clothing that cause indications that the occupant is near the inflator. Certain prior art systems operate to measure the distance from the inflator to the occupant, presumably because that is the physical variable most easily related to the potential for injury.

Many vehicles include an accelerometer located in the passenger compartment for sensing the deceleration of a crash. These accelerometers are incorporated in sensing and diagnostic modules or "SDMs", which are decision making centers for the vehicle occupant protection system. The output of the accelerometer may be integrated by an analog circuit or a microprocessor in the SDM to compute a difference between the velocity the vehicle was traveling before a crash and the velocity of the passenger compartment during the crash. The integral of the accelerometer output may be integrated again to obtain the second integral of the deceleration, which is the displacement of a free body from its initial position relative to the vehicle. An occupant not wearing a seat belt is, to a good approximation, a free body. Therefore, this calculation provides the distance an unbelted occupant has moved from his or her initial position at any time during the crash. Vehicles typically include seat belt latched sensors for indicating if seat belts are latched.

Ultrasonic distance measurement based on measuring a time period beginning when sound is generated by a sound emitter and ending when an echo from a object at the distance to be measured is received by a receiver located at a point near the sound emitter is well known and has been used for many years in such as focusing systems for cameras. Using ultrasonic distance measurement to measure the distance from the back of a vehicle seat to the back of a seat occupant works well at larger distances that provide time for vibrations excited during the sound transmission to subside and leave the receiver responsive to low intensity sound.

Position and angle sensors are in commercial production for sensing the position of a seat on its track and the angle the seat back is reclined.

Capacitive proximity sensors have been well known for many years and have many successful applications. In addition to measuring capacitance, the Q of the capacitance may be measured to provide additional information about the nature of the material being detected. Some materials including materials containing water tend to significantly reduce the Q of the sensed capacitance.

Capacitance between two electrical conductors is a property that is measured by the amount of separated charge that can be stored on the conductors per unit change of voltage between the conductors. Capacitance in electric circuits is deliberately provided by a device called a capacitor. A capacitor is two electrodes, often called "plates" for historical reasons, of conducting material electrically insulated from each other and separated by a dielectric. Any two members made of conducting material (herein called electrodes) and insulated from each other operate as a capacitor and technology for measuring the properties of a capacitor may be applied thereto.

Except for the leakage (usually small) through the dielectric, no current flows through a capacitor (i.e. from electrode to electrode) when it is subject to a constant voltage. Alternating current will pass readily, however, and is called displacement current.

When alternating voltage is applied between the electrodes of a capacitor there is energy loss in the capacitor. One measure of the loss is the Q or "quality factor" of a capacitor, which is $2\pi$ times the ratio of the maximum energy stored to the energy dissipated during one cycle of the voltage applied to the capacitor. Other measures of the loss are the "power factor" and "dissipation factor" which are interrelated by the expressions presented below. Both the capacitance and the Q of a capacitor are strongly influenced by the dielectric.

Ignoring the self inductance of the lead wires, a capacitor is conventionally viewed as a pure capacitance C having capacitive reactance $X_C$ which is a measure of opposition to flow of an alternating current of frequency f given by:

$$x_C = \frac{1}{2 \cdot \pi \cdot f \cdot C}$$

in series with an energy dissipating resistance $R_C$ and the combination has an impedance $$Z = \sqrt{R_C^2 + X_C^2}$$

In certain capacitors there is a resistance in parallel with the capacitor. A well known example is electrolytic capacitors that have significant series resistance and may have significant leakage through the electrolyte. In automobile seat occupant sensors steps are taken to insulate the capacitor electrodes to prevent leakage across the capacitor. Therefore, a model comprising a zero loss capacitance C in series with an energy dissipating resistance $R_C$ is believed to be most like actual seat occupant sensing systems.

The Power Factor (PF) is defined as the ratio of the effective series resistance $R_C$ to the impedance Z and is usually expressed as a percentage.

The Dissipation Factor (DF) is the ratio of the effective series resistance $R_C$ to capacitive reactance $X_C$ and is usually expressed as a percentage. The DF and PF are essentially equal when the PF is 10 percent or less.

The Quality Factor (Q) is a figure of merit and is the reciprocal of the dissipation factor DF, $Q=X_C/R_C$.

Circuits for measuring capacitance and the Q of a capacitor are well known and are incorporated in many commercially available measuring instruments and are implemented on single silicon semiconductor dice by several makers.

The concept of the impedance of a capacitor leads to measuring the capacitance of a capacitor by applying an alternating current voltage to the capacitor and measuring the displacement current through the capacitor. The impedance Z is equal to the applied voltage V divided by the displacement current $I_D$: $Z=V/I_D$. The current leads the voltage by a phase angle (phi).

If the Q of the capacitor is large, $R_C$ can be ignored, Z and $X_C$ are approximately equal, and the capacitance is obtained directly from the displacement current $I_D$ and the frequency f and voltage V of the applied alternating current $$C = \frac{I_D}{2 \cdot \pi \cdot f \cdot V}$$

For smaller Q or greater precision, the capacitive reactance $X_C$, the equivalent resistance $R_C$, and the capacitance C are calculated from:

$X_C = Z \cdot \sin(phi)$  $R_C = Z \cdot \cos(phi)$ $$C = \frac{1}{2 \cdot \pi \cdot f \cdot X_C}$$

Page 322 of the book *Electrical Instruments and Measurements* by Walter Kidwell and published in 1969 by McGraw-Hill, Inc. states that "Capacitance can be measured in a number of ways". It further states "Generally, there are two practical ways of measuring capacitance:"

"1. Absolute measurements in terms of other electrical units."

"2. Comparison methods, where the unknown capacitor is compared with a known standard that has been previously calibrated."

"Bridge methods are in the latter category, and it is to these methods that we shall confine our discussion on the following pages."

The aforementioned book by Walter Kidwell then proceeds to illustrate a Wien Bridge", a "Generalized capacitance bridge", a "Five terminal bridge network", a simplified method of connecting a three terminal network, a "Schering bridge", a "shielded Schering bridge", and a bridge having a "Wagner ground".

All of the capacitance bridges share the common feature of presenting an alternating current signal to the series combination of an unknown capacitor and a first known element(s) of the bridge. Other elements of the bridge with known properties form a second voltage divider producing a signal for comparison with the signal at the junction between the unknown capacitor and the first known element of the bridge. When the bridge is balanced, the amplitudes and phases of currents in all of the elements of the bridge can be calculated relative to the amplitude and phase of the alternating current signal. Therefore, the illustrated capacitance bridges operate by a process that determines the amplitude and phase shift of the current in the capacitor being tested.

The following illustrates, by using the examples of the Wien bridge and the Schering bridge, cases of capacitance measurement accomplished by applying a signal to one electrode of a capacitor and observing the signal at the other electrode of the capacitor.

FIG. 3 illustrates a Wien bridge. It is taken from FIGS. 10–15 of the aforementioned book *Electrical Instruments and Measurements*. Pages 322 through 329 of this book discuss measuring capacitance. In FIG. 3 the parallel combination of $C_d$ and $R_d$ represent respectively the energy conserving and energy dissipating properties of the capacitance to be measured. In FIG. 3 signal generator 212 provides a signal to electrode 214 of the unknown capacitor $C_d$. The signal at electrode 216 of the unknown capacitor represented by the parallel combination of $C_d$ and $R_d$ is observed and compared with a comparison signal provided by the resistors $R_a$ and $R_b$ by such as the illustrated headphones. The components $R_c$ and $C_c$ are varied to achieve a balance wherein there is no signal across the headphones 218. Peculiar to the Wien bridge, the energy conserving property $C_d$ of the unknown capacitance can be determined from the frequency of the signal from the signal generator and the values of the resistors in the bridge without knowing the capacitance of the adjustable capacitor.

When the Wien bridge of FIG. 3 is balanced as indicated by no signal at headphones 218 the displacement current through the unknown capacitor represented by the capacitance $C_d$ in parallel with resistance $R_d$ is equal to the displacement current through the variable capacitor $C_c$. Both the magnitude and the phase of the displacement current $I_D$ through the variable capacitor $C_c$ can be determined by the following process. The voltage across the series combination of $C_c$ and $R_c$ is equal to the voltage E from signal generator 212 times the ratio $R_b/(R_a+R_b)$. The current in the right side of the bridge is equal to the voltage across the series combination of $C_c$ and $R_c$ divided by the impedance of the series combination of $C_c$ and $R_c$ where $X_{Cc}$ is computed from $X_{Cc}=1/(2\cdot\pi f\cdot C_c)$. Accordingly, the displacement current and its phase are given by:

$$I_D = \frac{E \cdot R_b}{(R_a + R_b) \cdot \sqrt{R_c^2 + X_{Cc}^2}} \quad phi = \tan^{-1}\frac{\sqrt{R_c^2 + X_{Cc}^2}}{R_c}$$

The displacement current through the capacitor being tested (represented by the parallel combination of $C_d$ and $R_d$) is $I_D$ and the phase shift is phi because the two right legs of the bridge carry the same current. The voltage $E_d$ across the capacitor being tested is the voltage E from signal generator 212 times the ratio $R_a/(R_a+R_b)$:

$$E_d = \frac{E \cdot R_a}{R_a + R_b}$$

With the voltage $E_d$, current $I_D$, and phase shift phi across the capacitor being tested known, the impedance $Z_c$ can be calculated from $Z_c$=resistance $R_c$ times the ratio $R_a/R_b$. as described hereinabove the capacitive reactance $X_{Cc}$, the equivalent resistance $R_{Cc}$, and the capacitance $C_c$ are calculated from:

$$X_{Cc} = Z_c \cdot \sin(phi) \quad R_{Cc} = Z \cdot \cos(phi)$$

$$C_c = \frac{1}{2 \cdot \pi \cdot f \cdot X_{Cc}}$$

The Quality Factor (Q) is calculated from $Q_c = X_{Cc}/R_{Cc}$.

FIG. 4 illustrates a Schering bridge. It is taken from FIGS. 10–19 of the aforementioned book *Electrical Instruments and Measurements*. $C_2$, illustrated in FIG. 4, is an unknown capacitor that may have qualities that cause energy loss. In FIG. 4 signal generator 312 provides a signal to electrode 314 of capacitor $C_2$. The signal at electrode 316 of capacitor $C_2$ is observed and compared with a comparison signal provided by capacitor $C_1$ in series with the parallel combination of capacitor $C_4$ and resistor $R_4$ by such as the illustrated galvanometer 318. The components $C_4$ and $R_4$ are varied to achieve a balance wherein there is no signal across the galvanometer 318.

When the Schering bridge of FIG. 3 is balanced as indicated by no signal at or current through galvanometer 318 the displacement current through the unknown capacitor represented by the capacitance $C_2$ is equal to the current through the resistor $R_3$. The phase shift of the current in the circuit including unknown capacitor $C_2$ is the same as the phase shift in the left leg of the bridge. Both the magnitude and the phase of the displacement current $I_4$ through the fixed capacitor $C_1$, and therefore the voltage across capacitor $C_1$ can be determined by application of elementary circuit theory to the parallel combination of variable resistor $R_4$ and variable capacitor $C_4$ in series with capacitor $C_1$. The voltage across unknown capacitor $C_2$ is equal to the voltage across capacitor $C_1$. The displacement current $I_2$ through unknown capacitor $C_2$ is calculated from $I_2 = E_{R3}/R_3$ where $E_{R3}$ is the voltage across resistor $R_3$, which is known because it is the same as the voltage across the parallel combination of variable resistor $R_4$ and variable capacitor $C_4$, which was determined from elementary circuit theory.

With the voltage $E_2$, current $I_2$, and phase shift phi across the capacitor $C_2$ known, the impedance $Z_{right}$ of the right leg of the bridge is calculated from $Z_{right}$=the voltage E from signal generator 312 divided by the current $I_2$. As described hereinabove the capacitive reactance $X_{C2}$, the equivalent resistance $R_{C2}$, and the capacitance $C_2$ are calculated from:

$$X_{C2} = Z_{right} \cdot \sin(phi) \quad R_{C2} = Z_{right} \cdot \cos(phi) - R_3$$

$$C_2 = \frac{1}{2 \cdot \pi \cdot f \cdot X_{C2}}$$

The Quality Factor (Q) is calculated from $Q_2 = X_{C2}/R_{C2}$.

The two cases described in detail above illustrate that the process of measuring the capacitance and Q of a capacitor conventionally involves measuring the displacement current and the phase shift of the displacement current through the capacitor when a known alternating current signal is applied.

The features common to the Wien bridge and the Schering bridge are that an alternating current signal generator is connected to the series combination of the unknown capacitor and a known impedance. By balancing the bridge, the displacement current and phase shift of the displacement current in the unknown capacitor are determined from which the parameters of the unknown capacitor are calculated.

Vehicles in volume production include a fluid filled bladder placed under a seat cushion to sense the weight of a seat occupant by measuring the pressure in the fluid. Other sensors and mechanisms for determining seat occupant weight are in volume production.

A general object of this invention is to provide sensors for seat occupant sensing and associated calculation and decision making means for automotive vehicles, which also overcomes certain disadvantages of the prior art.

SUMMARY OF THE INVENTION

The present invention provides means for categorizing seat occupants. The categories may include such as child seats, persons, and cargo. If the occupant is a person, the categories may include features of the person and locations of the person.

Further, in accordance with certain preferred embodiments of this invention, capacitor electrodes and means responsive to the capacitance between the electrodes are provided to categorize and determine the position of an occupant, the system being highly reliable and economical to manufacture.

Further, in accordance with certain embodiments of this invention, a first capacitor electrode is located in the seat back of a vehicle seat and a second capacitor electrode is located in the seat cushion of a vehicle seat.

Further, in accordance with certain preferred embodiments of this invention, the position of a person in a seat is determined from the distance from the back of the seat to the back of the person. This is preferable to ascertaining the position of a person by measuring the position of the front of the person because it is unusual for there to be objects likely to affect capacitance between the back of the seat and the back of the person whereas a person is likely to place objects in front of himself or herself, which confuse known systems based on reflected sound or light.

Further, in accordance with certain preferred embodiments of this invention, the distance from the back of the seat to the back of the seat occupant is calculated from the capacitance between a capacitor electrode in the seat cushion and a capacitor electrode in the seat back when the distance from the back of the seat to the back of the occupant is small and can be accurately measured by capacitance sensing and ultrasonic or radar distance sensors may be inoperative.

Further, in accordance with certain preferred embodiments of this invention, at intermediate distances from the back of the seat to the back of the seat occupant, two measuring systems are operable. There is a sensor suitable for measuring larger distances. The capacitance based distance sensing system is used to calibrate and validate the distance sensor suitable for measuring large distances. This enables detection of and possible compensation for factors such as a thick outer coat or a pad placed over the seat back, which may lead to inaccurate measurement or errors by an ultrasonic distance sensor or a radar distance sensor.

Further, in accordance with certain embodiments of this invention, when the back of the seat occupant is located at large distances from the seat back that make distance calculated from capacitance inaccurate, the distance is measured by a means suitable for measuring large distance such as ultrasonic ranging or radar.

Further, in accordance with certain preferred embodiments of this invention, a second pair of capacitor electrodes and second capacitance sensing means enable calculating a second value at a lower height, of the distance from the seat back to the back of the seat occupant. The first and second measurements together define a line in contact with the back of the seat occupant that defines a plane transverse to the travel direction of the vehicle that defines the position of the back of the seat occupant.

Further, in accordance with certain preferred embodiments of this invention, the second measurement at a lower height enables additional determinations such as if the lap belt but not the shoulder belt is functioning.

Further, in accordance with this invention, a highly advantageous seat occupant presence and position sensing system is provided because, by ascertaining if a seat is occupied by a normally seated person or is vacant other important conditions such as forward or rearward facing child seats are also identified.

Further, in accordance with certain embodiments of this invention, occupants that have moved into positions where airbag deployment would be dangerous are detected. An occupant reaching forward to place or retrieve something on the dash may be dangerously close to the inflator for a short time. By determining that the back of the occupant is located at a position suggesting a deploying airbag might injure the occupant, this invention enables the air bag to be disabled to eliminate the risk of injury. Being voluntarily out of position is to be distinguished from the occupant being close to the airbag door during an accident, which is likely to happen if the seat belt is not in use or is being used incorrectly. The movement of the seat occupant during a crash when the seat belt is not fastened is predicted by doubly integrating the vehicle deceleration and adding the integral and a term resulting from the forward velocity of the occupant when the crash begins to accurately compute the movement of the seat occupant from the position before the crash to positions reached as the crash progresses.

Further, in accordance with the invention, a weight sensor may be provided for measuring the weight of the seat occupant. This enables estimating the distance from the back of the occupant to the front of the chest by assuming the occupant is a person having average dimensions for a person of the measured weight.

Further, in accordance with certain embodiments of this invention, a cushion based seat occupant weight sensor is provided in combination with a capacitance based seat occupant sensor. Cushion based seat occupant sensors are less responsive to the weight of a seat occupant in a seat with a reclined seat back than they are to the weight of the same occupant when the seat back is upright. The capacitance sensor of the invention distinguishes a child sitting upright or leaning forward where the full weight of the child is detected from an adult positioned against a reclined seat back in which position only a fraction such as one half of the weight of the adult is detected.

Further, in accordance with certain embodiments of this invention, information is provided that prevents airbag deployment when deployment would be dangerous to an occupant. For example, a person stretching forward and upward to view the road is particularly vulnerable to injury by a rearward deploying air bag. A forward leaning occupant is detected either as out-of-position by sensing the large distance from the back of the seat or is not detected. In both cases the desired action is taken, which is that the airbag is prevented from deploying.

Further, in accordance with certain embodiments of this invention, the occupant presence and position sensing system of the invention measures the distance the occupant is leaning forward from the normal position against the seat back. This determines an upper torso position relative to the seat back if the assumption is made that the lower back of the occupant is at the surface of the seat back. The position of the occupant relative to the seat back is combined with the position of the seat cushion and back calculated from the seat track position and the seat back recline angle to determine the position of the occupant's back relative to the vehicle structure. An average value may be used for the distance from the back to the front of the occupant. If a weight sensor is present an average for a person of the measured weight is used. The position of the front of the occupant is preferably used to calculate the distance from the occupant to the airbag. This information is used to prevent air bag deployment when the seat occupant is positioned where deployment would be dangerous.

Further, in accordance with certain embodiments of this invention, the occupant presence and position sensing system of the invention measures the distance the occupant has moved forward during a crash from the normal position against the seat back. A second electrode at a lower height and a second capacitance sensor enable calculating the distance from the lower back of the occupant to the surface of the seat at a lower height. The two points determine a straight line in contact with the back of the seat occupant. The position of the seat back calculated from the seat track position and the seat back recline angle is combined with the occupant position relative to the seat to determine the position of the occupant relative to the airbag. This information is used to prevent air bag deployment when the seat occupant is likely to be in a position where deployment would be dangerous.

Further, in accordance with certain embodiments of this invention, the capacitive presence and position sensing system may also measure the Q of the capacitances being sensed to thereby ascertain additional information about the occupant of the seat.

Further, in accordance with certain embodiments of this invention, certain seat occupation categories are each represented by distinct ovals in the Q–log C plane thereby providing a simple method for interpreting a measurement of capacitance and Q.

Further, in accordance with certain embodiments of this invention, the occupant presence and position sensor of the invention continuously determines the position of the seat occupant relative to the seat. The position of the seat occupant relative to the seat is communicated to a microprocessor, which combines the occupant position with the position of the seat determined from the seat track and recline measurements to continuously make available the position of the occupant relative to the structure of the vehicle.

Further, in accordance with certain embodiments of this invention, during a collision, an initial position and velocity of the seat occupant relative to the structure of the vehicle is combined with the second integral of the acceleration measured by the accelerometer in the SDM to determine the position of an unbelted seat occupant relative to the vehicle interior as the crash progresses. The occupant position is estimated to be the initial position adjusted forward by the amount of the second integral. This position estimate is also useful if only the lap belt engages the occupant and the head and upper torso move forward according to the second integral while the entire torso moves in a motion resembling rotation about the seat belt.

Further, in accordance with certain embodiments of this invention, differences in seat occupant position may be taken at periodic times to ascertain any forward velocity the occupant might have with respect to the seat. During a collision, the velocity so determined times the time since the initial position was determined is added to the second integral of the deceleration to obtain an estimate of the current position of the seat occupant.

A complete understanding of this invention may be obtained from the description that follows taken with the accompanying drawings.

BEST MODE FOR CARRYING OUT THE INVENTION

Figure 3:
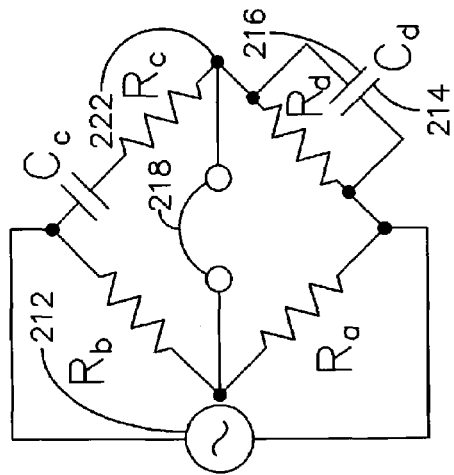
FIG. 3 shows a Wien bridge circuit for measuring capacitance.
Figure 4:
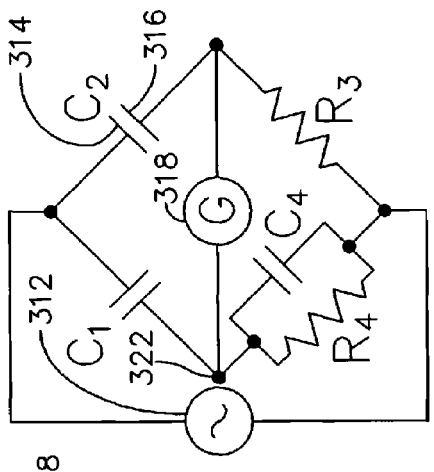
FIG. 4 shows a Schering capacitance bridge circuit.
Figure 1:
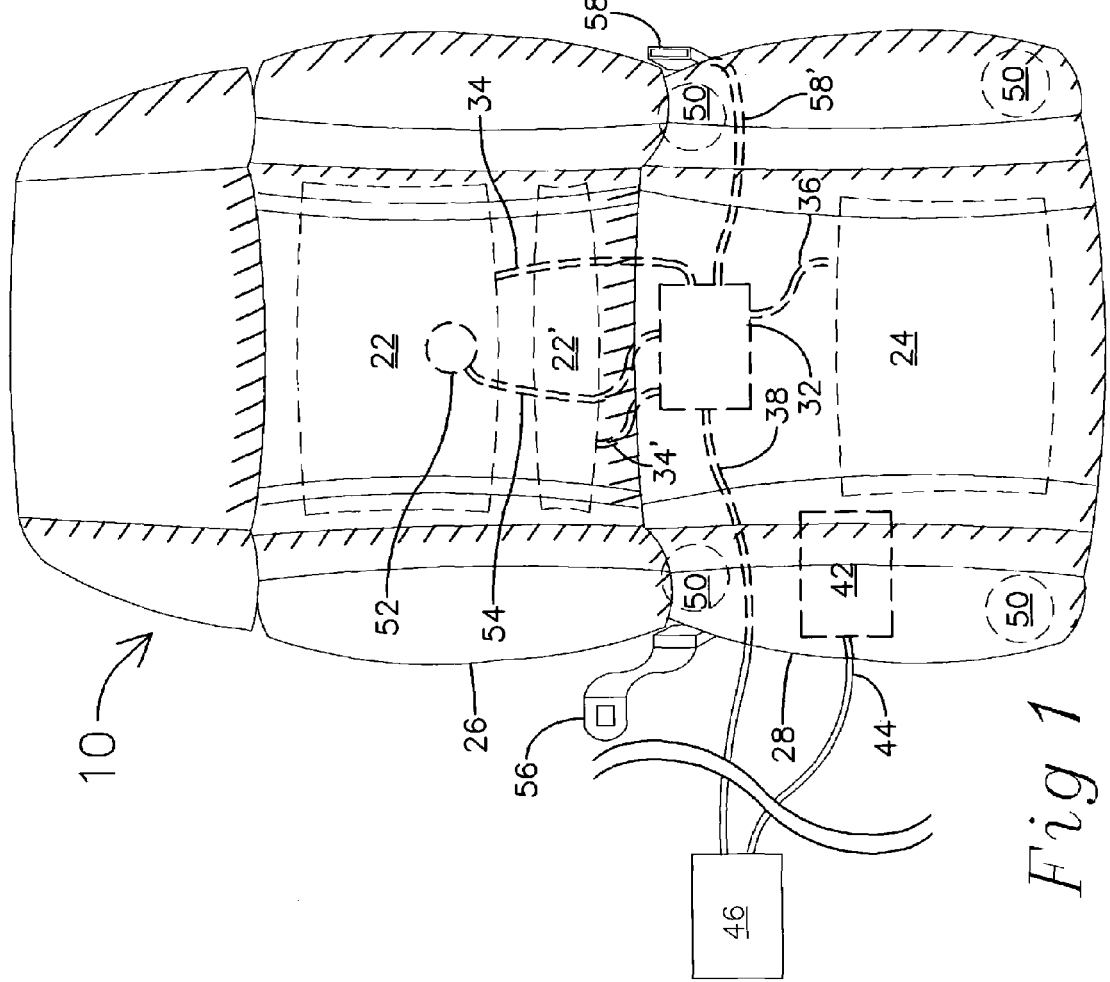
FIG. 1 shows an automobile seat and illustrates sensors for providing data from which the occupant position can be calculated.

Referring now to FIG. 1, the occupant presence and position sensing system 10 comprises two electrodes 22 and 22' beneath the fabric of a vehicle seat back 26, and electrode 24 beneath the fabric of a vehicle seat cushion 28. An electronic circuit 32 is connected with electrode 22 by electrical conductor 34, with electrode 22' by electrical conductor 34', and with electrode 24 by electrical conductor 36. Electronic circuit 32 is connected with four load cells 50 by four electrical conductors (not illustrated) and seat belt latch 58 by conductor 58'. Load cells 50 sense the weight of the seat occupant. Latch 58 indicates through conductor 58' if it is latched. Electronic circuit 32 is connected with distance sensor 52 by electrical conductor 54. Electronic circuit 32 is also connected with the decision making center 46 of the vehicle occupant protection system by electrical conductor 38. During operation of the vehicle, electronic circuit 32 repeatedly measures the capacitance and Q between electrode 22 and electrode 24, and between electrode 22' and electrode 24 and sends an electrical signal through conductor 38 to inform the decision making center 46 of the results of the two capacitance measurements, the weights sensed by load cells 50, the distance measured by distance sensor 52, and the status of seat belt latch 58. The occupant presence and position sensing system of the invention may also include seat position sensor 42 that sends an electrical signal through conductor 44 to keep the decision making center 46 of the occupant protection system informed about the position of the seat. It will be appreciated as the description proceeds that the invention may be implemented in different embodiments.

Referring particularly to FIG. 1, the electrodes 22, 22', and 24 may be any electrically conducting material that is sufficiently flexible that it will be imperceptible to the seat occupant when placed beneath the fabric of the seat. A preferred electrically conducting material for electrodes 22, 22', and 24 is a fabric woven partially or entirely of copper or aluminum wires that are sufficiently fine to provide the required flexibility for seat comfort. Another preferred material is a woven textile fabric on which aluminum or another metal has been vapor deposited. Electronic circuit 32 may incorporate any of the many known circuits for measuring capacitance and Q and which provides sufficient accuracy for measuring capacitances in the range of the capacitance between electrodes 22 and 24 and between electrodes 22' and 24. In one experimental seat occupant presence and position sensing system 10, the capacitance between electrodes 22, and 24 ranged between five picofarads and five thousand picofarads. A similar range is likely in other systems. The second capacitor electrode 22' is included if there is a requirement to measure the distances from two locations on the back of the seat to two locations on the back of the seat occupant. Electronic circuit 32 includes a microprocessor or other means for analyzing the measured capacitances, Qs, weights, and distances and providing an interpretation of the measurements through conductor 38 to the decision making center 46 of the vehicle occupant protection system. Electronic circuit 32 may be unitary (not shown) with decision making center 46.

Seat position sensor 42 if it is included may be any sensor suitable for determining the position of the seat relative to the structure of the vehicle and transmitting that information to the decision making center 46 of the vehicle occupant protection system. A preferred sensor for seat position sensor 42 would be a combination of a known seat track position sensor and a known seat back recline sensor compatible with the seat, the two sensors together fully defining the position of the cushion and back of the seat. The decision making center 46 of the vehicle occupant protection system is preferably an SDM containing an accelerometer for sensing vehicle deceleration during a crash and a microprocessor containing code for analyzing the accelerometer output, which analysis typically integrates the accelerometer output to obtain the first integral of the acceleration. The first integral at each point in time is the change in vehicle speed from the speed before the crash to the speed at that point in time. There may also be code in the microprocessor for integrating the change in vehicle speed to determine the second integral of deceleration during a crash, which, at each point in time during a crash, is the distance a free body in the vehicle is displaced relative to the passenger compartment of the vehicle.

Seat occupant weight sensors 50 may be any load cells known to be suitable for measuring the weight of the seat occupant. Other known seat occupant weight sensors, for instance a single sensor such as a bladder type sensor underlying the seat cushion may be selected by those skilled in the relevant arts.

Distance sensor 52 may be any known distance sensor such as an ultrasonic distance sensor or a radar distance sensor. Distance sensor 52 is preferably an ultrasonic distance sensor or a radar distance sensor adapted to view a narrow angle. Larger aperture ultrasonic sensors for cameras are adapted to limit sensed distance to objects in a narrow solid angle. Distance sensor 52 is preferably pivoted by a mechanism that maintains its beam constantly in a horizontal direction as the seat back is reclined. Distance sensor 52 may be required to enable determining occupant position over a large range of occupant positions.

Seat belt 56 and latch 58 may be any suitable seat belt and mating latch having a seat belt latched sensor for providing an electric signal or closing a switch to indicate the seat belt is latched.

Figure 2:
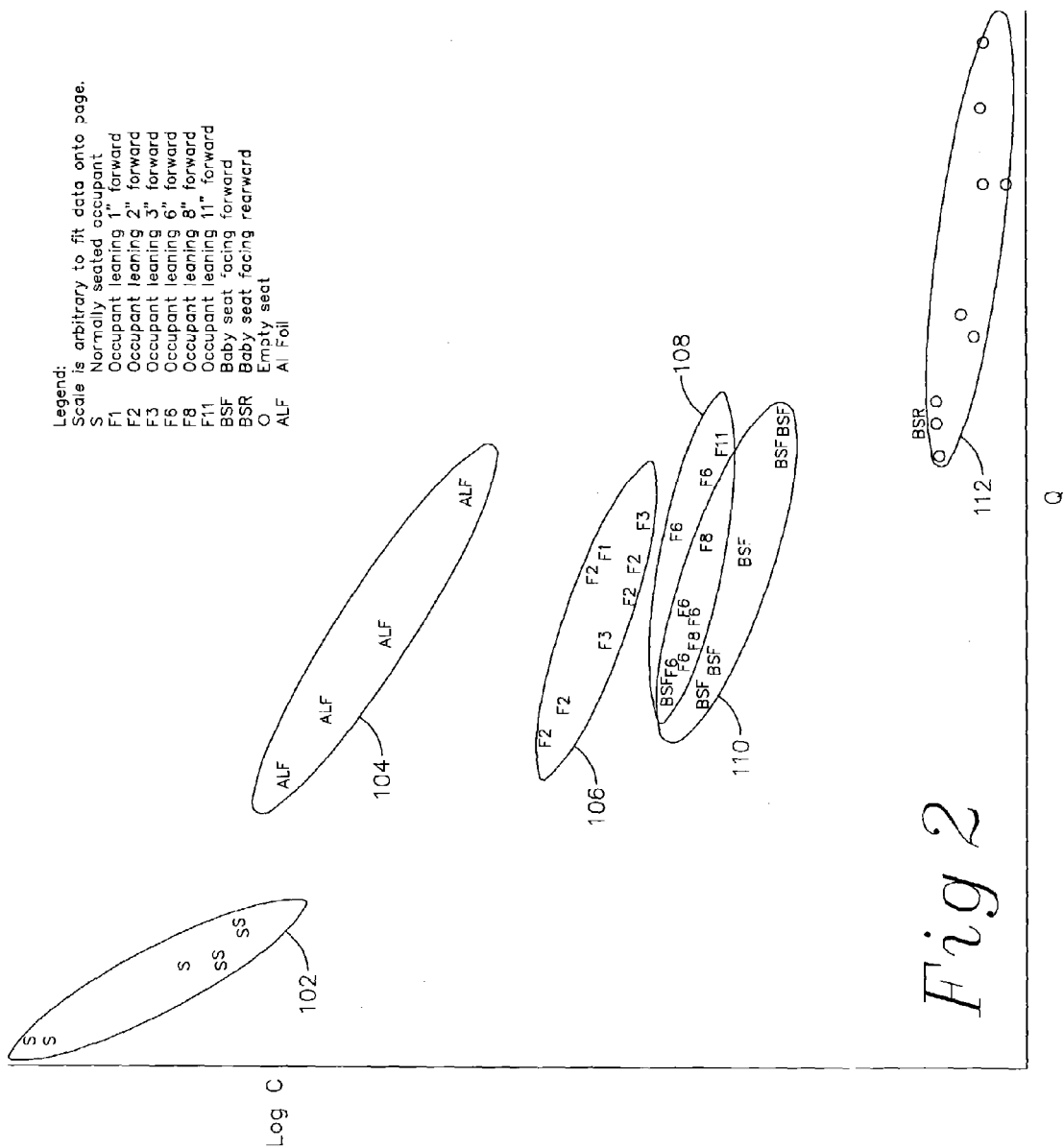
FIG. 2 shows graphically the results of measuring the capacitance between two of the electrodes illustrated in FIG. 1 for occupant of different categories.

Continuing now with reference to FIG. 2, FIG. 2 illustrates measurement points (indicated by letters S, F1, F2, BSF, etc.) resulting from plotting the logarithm of the capacitance as the vertical coordinate and Q as the horizontal coordinate for a number of seat occupant positions and other situations such as a vacant seat, child seat, etc. Measurement points fall into groups around which ovals 102, 104, 106, 108, 110 and 112 are drawn. Further, each oval contains only points that are characteristic of a certain occupant position or other occupant feature and, with the exception of ovals 108 and 110, these ovals are clearly distinguished from each other by their physical separation. The fact that, excepting the aforementioned exception of the backward facing baby seat (oval 110), the ovals are physically separated from each other illustrates that different categories of seat occupant are clearly distinguishable. This illustrates that a measurement of capacitance and Q when a person is positioned on the seat (or when the seat is vacant) can determine the position of a person on a seat or the absence of a person and can distinguish between persons and things that are not human.

FIG. 2 shows, for example, seven different measurement points in the oval 102 each represented by the letter "S". Each of the seven points in the oval 102 is the result of making a measurement of capacitance and Q for an occupant seated in a "normally seated" position. For each measurement the position on the horizontal axis corresponding to the measured Q and the position on the vertical axis corresponding to the measured capacitance are located and a letter "S" is placed at the point on FIG. 2 having those horizontal and vertical coordinates. The group of measurement points are distributed so that they fall within an oval-shaped boundary 102. All of the points in oval 102 result from measuring the capacitance and Q for a person seated in a normal position. Oval 106 encloses a group of points "F2" that are obtained from measurements with the seat occupant leaning two inches forward. Oval 106 also encloses one measurement point F1 taken with the occupant leaning one inch forward and one measurement point F3 taken with the occupant leaning three inches forward. All of the points in oval 112 represent a group of measurement points "O" taken with an unoccupied seat. Accordingly, it can be said that all points in oval 102 are "characteristic of measurement points resulting from measurements with the seat occupied by a person in the normal position. Similarly, all points in the oval 112 are characteristic of measurement points resulting from measurements made when the seat is vacant.

The confusion between oval 110 and oval 108 can be prevented. The measurements of oval 110 resulted from testing a baby seat having metallic structural elements located where they affected the measured capacitance. Only one of several baby seats tested had a structure that was sensed by the occupant presence and position sensing system of the invention. One way to avoid any possibility of confusion between a forward facing baby seat and a person leaning forward is to use a different baby seat. It is evident that the case of a normally seated person indicated by measurements within the oval 102 are very clearly distinguishable from the case of an unoccupied seat indicated by measurements within the oval 112. The cases of the occupant leaning one to three inches forward indicated by measurements within the oval 106 and cases of the occupant leaning six to 11 inches forward indicated by measurements within the oval 108 are very clearly distinguished from the cases of no occupant and cases of a normally seated occupant but are only marginally distinguished from each other. However, the distinction is clear and it is expected to become clearer with further development.

It is desirable to distinguish a person in a seat from something that is not human. The measurements within oval 104 result from placing aluminum foil over the area where an occupant might sit. The different points were obtained by varying the size and position of the aluminum foil. Oval 104 of FIG. 2 is clearly distinguished by its physical separation from ovals 102 and 106, which are the nearest ovals resulting from measurements made with a person in the seat. The clear physical separation between oval 104 and ovals 102 and 106 shows that a person and aluminum foil are clearly distinguished.

It is desired to distinguish a seat occupied by an adult that would require an air bag to be deployed from a seat containing a baby seat where deploying an air bag might cause injury. Most baby seats are molded of plastic and keep the baby sufficiently far from the seat that the occupant presence and position sensing system 10 returns measurements indicating the seat is vacant. Therefore, for such baby seats a baby in a baby seat is easily distinguished from a person who is not in a baby seat. However, certain baby seats incorporate metal frames to which a capacitive sensor responds. For this reason a baby seat having a metal frame was tested both in the forward facing position and in the rearward facing position. In the rearward facing case the metal structure was not near the seat back and the required distinction is easily made. Please refer to the measurement point labeled BSR near oval 112 in FIG. 2 to see the response to the rear facing case. The measurement points for the forward facing case are surrounded by oval 110 in FIG. 2. The data in oval 110 indicate that the baby seat is distinguished from a person in positions where air bag deployment would be desirable but is not distinguishable from the cases where the person is leaning 6 to 11 inches forward and air bag deployment may or may not be desired. For the particular baby seat having a metal frame, the distinction can be enhanced by surrounding the tubular parts of the frame that are closest to the electrodes 22 and 24 with plastic tubing to increase the distance from the frame to electrodes 22 and 24 hidden under the fabric of the seat. As mentioned hereinabove, a baby or child seat without a metal frame or one having a frame that has less effect on the capacitance between electrodes 22 and 24 may substituted.

Ovals suitable for identifying the required categories of seat occupant are determined for a seat and vehicle by experimenting. The parameters defining the ovals are then permanently stored in the memory of either the microprocessor of the decision making center 46 of the vehicle occupant protection system or in the memory of a microprocessor associated with electronic circuit 32. Preferably, the stored information is the horizontal and vertical components of the major and minor axes of the ovals treated as vectors each divided by the square of the length of the vector as described in detail hereinafter in conjunction with the description of the operation of the invention. Storing components of vectors having inverted lengths reduces the number of computations required when interpreting a capacitance and Q measurement as will be explained hereinafter when describing the operation of the embodiment of the invention wherein electronic circuit 32 includes a microprocessor.

The materials and methods referred to hereinabove are only suggestions and other materials and methods may be selected by those skilled in the relevant arts.

The operation of the occupant presence and position sensing system 10 of the invention will now be described with reference to FIGS. 1 and 2. In operation of the system, the electronic circuit 32 repeatedly measures the capacitance and Q between electrodes 22 and 24, and between electrodes 22' and 24 at a repetition rate such as 100 measurements per second. One hundred measurements per second enables monitoring the movement of a person as a crash progresses.

The process of associating the result of a measurement of Q and capacitance with a category of seat occupant may be understood as the computerized equivalent of the manual process of plotting the point representing the Q and capacitance in FIG. 2. If it is within an oval then it is assigned to that oval. For instance, if the point lies within oval 102 then it is assigned to oval 102. Any measurement points that do not fall within an oval are assigned to the oval to which the measurement point appears to be closest.

In a simplified embodiment of the invention only the capacitance is measured by electronic circuit 32, which transmits each capacitance measurement through conductor 38 to the decision making center 46 of the vehicle occupant protection system. The decision making center 46 then considers the recently received capacitance value when it makes its decision to deploy or not deploy the air bags. Referring to FIG. 2, it can be seen that capacitance alone is sufficient to estimate the distance of the back of a person to the back of the seat and to determine if a seat is vacant but is not adequate for distinguishing aluminum foil from a person and is inferior to the combination of the logarithm of capacitance combined with Q for ascertaining the distance from the back of a person to the seat back.

In another embodiment of the invention the electronic circuit 32 transmits the capacitance and Q of each measurement through conductor 38 to the decision making center 46 of the vehicle occupant protection system. The decision making center 46 then considers the recently received capacitance and Q values when it makes its decision to deploy or not deploy the air bag.

In yet another embodiment of the invention, electronic circuit 32 includes a microprocessor that interprets the measurements and supplies interpreted results to the decision making center 46 of the vehicle occupant protection system. In this embodiment electronic circuit 32 examines the capacitance and Q of each measurement to determine to which oval the measurement should be assigned and transmits information identifying that oval to the decision making center 46 of the occupant protection system. Preferably, a number identifying that oval is transmitted. For example, if the point is assigned to oval 102, the number 1 might be transmitted, if the point is assigned to oval 104 the number 2 might be transmitted, etc. The assigned oval is preferably identified by a process, repeated for each oval, that is equivalent to transforming the coordinates of the graph to convert the oval to a circle of unit radius. For each measurement of capacitance and Q the distance in the transformed coordinate system from the measurement point to the center of the circle representing the oval is computed. This is repeated for each oval. The oval for which the distance from the measurement point to the center of the corresponding circle is smallest is selected as the oval to which the measurement is assigned.

The preferred process is described in the following: For each oval, vectors $V_{Major}$ and $V_{Minor}$ are defined from the center of the oval to the upward ends of its major and minor axes respectively. Vector $V_{Major}$ is divided by the square of its length and vector $V_{Minor}$ is divided by the square of its length to obtain two vectors $V_{MajorBar}$ and $V_{MinorBar}$ having lengths that are the reciprocals of the lengths of the original vectors. Vectors $V_{MajorBar}$ and $V_{MinorBar}$ are defined by their horizontal and vertical components $V_{MajorBarQ}$, $V_{MajorBarC}$ and $V_{MinorBarQ}$, $V_{MinorBarC}$ respectively. For each oval the coordinates of the center of the oval and the components $V_{MajorBarQ}$, $V_{MajorBarC}$ and $V_{MinorBarQ}$, $V_{MinorBarC}$ are stored at manufacturing time in the memory of the microprocessor of electronic circuit 32. A measurement of capacitance and Q defines a vector $MP_{Oval}$ for each oval, which is a vector from the center of the oval to the measurement point on the Q–log(Capacitance) (or, for brevity, Q-logC) plane. The vector $MP_{Oval}$ is defined by its horizontal and vertical components $MP_{OvalQ}$ and $MP_{OvalC}$ respectively. The horizontal component $MP_{OvalQ}$ of $MP_{Oval}$ is the difference between the Q coordinate of the center of the oval in the Q-logC coordinate system and the measured Q. The vertical component $MP_{OvalC}$ of $MP_{Oval}$ is the difference between the logC coordinate of the center of the oval in the Q-logC coordinate system and the logarithm of the measured capacitance. The vector dot (scaler) product of $MP_{Oval}$ and each of the vectors $V_{MajorBar}$ and $V_{MinorBar}$ is computed. The vector dot products are computed according to the formulas:

$$MP_{Oval} \cdot V_{MajorBar} = MP_{OvalC} \cdot V_{MajorBarC} + MP_{OvalQ} \cdot V_{MajorBarQ}$$

and $$MP_{Oval} \cdot V_{MinorBar} = MP_{OvalC} \cdot V_{MinorBarC} + MP_{OvalQ} \cdot V_{MinorBarQ}$$

The square of the distance from the center of the oval to the measurement point in the transformed Q-logC coordinate system is computed according to the formula:

$$\text{Distance Squared} = (MP_{Oval} \cdot V_{MajorBar})^2 + (MP_{Oval} \cdot V_{MinorBar})^2$$

Each dot product is the scaled projection of the vector $MP_{Oval}$ on one of the axes of the oval. Distance Squared is less than 1.0 when the measurement point plotted in the Q-logC plane is inside an ellipse that is centered at the center of the oval and has major and minor axes equal to the major and minor axes respectively of the oval. Distance Squared is greater than 1.0 when the measurement point is outside the aforementioned ellipse. Distance Squared is a measure of how similarly located a measurement point is to the measurement points that defined the oval. The process of assigning an oval to a measurement point consists of calculating Distance Squared for each oval and selecting the oval for which Distance Squared is least. The number of the oval for which Distance Squared is least is then transmitted to the decision making center 46 of the occupant protection system.

In a fourth embodiment of the invention, electronic circuit 32 contains a read only memory containing an array having the desired oval identifying number for each possible pair of capacitance and Q coordinates. For example, if the electronic circuit 32 were designed to measure the capacitance as one of thirty possible values and Q as one of thirty possible values, an array containing 900 values of oval identifying numbers with 30 rows for the thirty values of capacitance and 30 columns for the thirty values of Q enables the microprocessor to use the measured capacitance and Q to select the appropriate number from the array. The oval identifying number selected from the array according to the capacitance and Q is transmitted to the decision making center 46 of the occupant protection system.

Embodiments of the invention that include seat position sensor 42 determine the position of the occupant relative to the interior of the vehicle during a crash. To accomplish this, the occupant presence and position sensor of the invention continuously informs the decision making center 46 of the distance from the seat back to the back of the occupant. Each time the microprocessor in the decision making center 46 receives a seat back to seat occupant measurement, it computes the positions of parts of the occupant such as the head and the chest based upon the distance from the back of the seat to the back of the person, the position of the seat provided by seat position sensor 42, and average dimensions of the seat occupant. If the occupant weight is known, average dimensions for a person of that weight are used. The microprocessor in the decision making center 46 may also estimate the velocity of the seat occupant relative to the vehicle by computing the difference between the current position of the seat occupant and the previous position of the seat occupant and dividing the difference by the time interval between the measurements.

For example, if the distance from the back of the seat to the back of the person is zero (the normal condition) the torso would be assumed to be an average torso and the front surface of the torso would therefore be calculated to be about ten inches offset from the surface of the back of the seat and approximately parallel with the back of the seat, and the head would be calculated to be above the torso. If the seat is equipped with an occupant weight sensing system then the weight of the seat occupant may be used to estimate the distance from the back of the occupant to the front of the torso instead of using an average for all adults.

In a second example, assuming the occupant is leaning forward, if the back of the seat occupant is measured to be four inches from the back of the seat and the distance sensor is located fourteen inches above the seat cushion, then the front surface of the torso would be calculated to be about ten inches offset (assuming the thickness of an average person) from an imaginary surface beginning at the lower surface of the seat back and rising at an angle that places the imaginary surface four inches away from the surface of the seat back at a height fourteen inches above the surface of the seat cushion. If the forward movement results from a crash the occupant may not be leaning forward, rather the whole body may be moving forward simultaneously. Nevertheless, the calculation of the occupant position may still be used for deciding if the airbag should be deployed because it is the distance from the seat back to the upper back of the occupant that determines the position of the part of the occupant with which the airbag interacts. Whether the occupant is leaning forward or the whole body has moved forward only determines the angle of the axis of the torso from the vertical, which is less important than the forward position of the part of the occupant with which the airbag interacts.

In an alternate second example to the foregoing second example, the occupant is moving forward consequent to a crash. The existence of a crash is known from the accelerations measured by the accelerometer in the SDM. If the distance from the back of the seat to the back of the seat occupant is measured to be four inches from the back of the seat, then the front surface of the torso would be calculated to be about fourteen inches offset (adding four inches to the assumed thickness of an average person) from the surface of the back of the seat and parallel with the back of the seat, and the head would be calculated to be above the torso.

In many crashes the SDM would have initiated airbag deployment about forty milliseconds before the seat occupant of this alternate second example moved forward four inches from the position occupied prior to the crash. Knowledge of passenger movement that occurs after the SDM initiates airbag deployment is only useful if a second release of gas into the airbag is initiated much later than the initial deployment.

However, there are crashes in which braking prior to the crash causes the occupant to be out of the normal seated position and moving forward when crash analysis determines airbag deployment is warranted. Also, there are crashes that include multiple collisions in which the first collision does not warrant airbag deployment but a later collision does warrant airbag deployment. In these circumstances knowledge of the position and forward velocity of the seat occupant relative to the vehicle may be useful.

Continuing with the foregoing alternate second example, because the forward movement is the result of the deceleration of a crash the occupant is moving. For example, assume the previous measurement of the position of the occupant was made 0.01 second earlier and at that time the distance from the back of the seat to the back of the seat occupant was 3.1 inches. The occupant was, therefore, moving forward relative to the vehicle at an average speed of 90 inches per second during the most recent 0.01 second interval.

In the alternate example the three following conditions are possible:

1) Both the shoulder and the lap belts are operational and occupant movement will soon stop because the belts will not allow further forward movement of the occupant. The belt latched indicator should be on.

2) Only the lap belt is operational, possibly because the occupant was uncomfortable with the shoulder belt in the correct position. In this case the occupant will rotate forward about the lap belt. In this case the upper part of the torso and the head will move approximately as a free body. The belt latched indicator should be on.

3) The seat belts are not operational and the occupant is moving as free body. The belt latched indicator should be off but could be on if the occupant is sitting on the seat belt.

Continuing with the alternate second example, the possibility 1) can be tested by continuing to monitor the distance from the back of the seat occupant to the seat back. Cases 2) and 3) result in similar initial movement of the head and chest, which is the movement of a free body inside the vehicle. After twelve to eighteen inches of forward movement cases 2) and 3) begin to differ because of the downward rotation of the torso in case 2), which is probably after the decision to deploy the airbag must be made. The projected forward movement of the occupant from the initial (moved four inches forward) position may be calculated by using the following expression for the movement of a free body:

$$S(t) = S_0 + \int_{T_0}^{t} \left( V_0 + \int_{T_0}^{t} a \cdot dt \right) dt$$

where S(t) is the computed distance from the seat back at time t, $S_0$ is the initial distance from the seat back (four inches in the current example) at initial time $T_0$ $V_0$ is the velocity at time $T_0$ (90 inches per second in the current example), and a is the deceleration of the vehicle measured by the accelerometer in the SDM.

In a third example involving an embodiment of the invention having capacitor electrode 22', the distance from the back of the seat to the back of the seat occupant is measured to be two inches at a height of four inches above the seat cushion based upon the capacitance between electrodes 22' and 24. Further, the distance from the back of the seat to the back of the seat occupant is measured to be three inches at a height of fourteen inches above the seat cushion based upon the capacitance between electrodes 22 and 24. This measurement could result from the initial deceleration at the beginning of a vehicle crash. From these measurements the front surface of the torso would be calculated to be about ten inches offset (assuming an average person) from a plane surface intersecting a horizontal line transverse to the vehicle movement and intersecting a point four inches from the surface of the seat cushion and two inches from the surface of the seat back and also intersecting a point three inches from the surface of the seat back at a height fourteen inches above the surface of the seat cushion.

Continuing with the third example, the occupant may be moving. For example, assume the previous measurement of the position of the occupant was made 0.01 second earlier than the current position was measured and, at that time, the distance from the back of the seat to the back of the seat occupant was 1.7 inches at electrode 22' and was 2.7 inches at electrode 22. The occupant was, therefore, moving forward relative to the vehicle at an average speed of 30 inches per second during the most recent 0.01 second interval. When the inertia of the occupant causes the occupant to move sufficiently forward of the normal seated position to where the capacitance between electrodes 22 and 24 does not accurately indicate the position of the seat occupant, the position of the occupant can be calculated from the position and time when the position is accurately indicated by using the following expression:

$$S(t) = S_0 + \int_{T_0}^{t}\left(V_0 + \int_{T_0}^{t} a \cdot dt\right) dt$$

where $S(t)$ is the computed position at time $t$, $S_0$ is the distance from a reference position (two inches and three inches from the seat back in this example) at time $T_0$ when the position is known, $V_0$ is the velocity at time $T_0$ (30 inches per second in this example) and $a$ is the deceleration measured by the accelerometer in the SDM.

During a crash, if the occupant is not belted the occupant will move as a free body and the parts of the occupant will move forward from their initial positions relative to the interior of the vehicle a distance equal to the second integral of the acceleration. Therefore, when it is known that the seat belt is not fastened from the sensor in latch 58 and the seat occupant has moved beyond where the position can be measured by the occupant presence and position sensor of the invention, the position of the occupant is estimated by projecting forward the position of the occupant measured at an earlier time such as when the crash began.

During a crash, if the occupant is belted as indicated by the sensor in latch 58, the lap belt may allow the lower part of the occupant limited movement. Further, the head and shoulders may move forward by an amount allowed by the shoulder belt. Accordingly, the parts of the occupant will move forward from their initial positions a distance equal to the second integral of the deceleration but limited by the belts. Depending on the seat belts, this amount of movement may or may not put the occupant beyond the distance where the capacitance based position sensing system of the invention can measure the occupant position.

When the occupant moves outside the range of the capacitance based distance sensor, then sensor 52 may be used to measure the larger distances from the back of the seat occupant to the back of the seat. Distance sensor 52 provides distance measurements repeatedly at a repetition rate such as 100 times per second. Distance sensor 52 is a radar or ultrasonic distance sensor that may not provide accurate distance measurements when the back of the seat occupant is near or against the seat back. Also, distance sensor 52 may be disabled by something covering sensor 52 such as a coat draped over the seat back. To assure correct operation, the distance measured by distance sensor 52 is compared with the distance ascertained from the capacitance between electrodes 22 and 24. If there is agreement over a range of distances, then distance sensor 52 is assumed to accurately measure the occupant position at distances not ascertainable from the capacitance between electrodes 22 and 24. The difference may also be used to adjust the calibration of distance sensor 52 by the difference. Also, distance measured by sensor 52 may be used to confirm occupant positions determined by integrating the deceleration of a crash. Distance measured by sensor 52 may be reason to not deploy an airbag when very large distances between the back of the seat and the back of the seat occupant suggest the occupant is located where deployment might injure the seat occupant.

The estimated occupant position based on the movement of a free body according to the measured deceleration and the occupant position determined from measurement of the distance from the back of the occupant to the surface of the seat back are both known within the occupant protection system. If the measured position of the seat occupant agrees with the calculated position to which a free body would have moved then: i) the seat belt may not be properly installed, or ii) the occupant may be unbelted (i.e. sitting on the latched belt), or iii) the payout of the belt is not yet complete. Knowledge of the parameters of the belt can be used to determine whether the belt is still paying out or is not functioning as intended.

Accordingly, the seat occupant sensing system of the invention can determine during a crash if the seat belt is restraining the seat occupant. During a crash, the distance from the upper back of the occupant to the back of the seat and the distance to the lower back of the occupant to the back of the seat are separately measured. If, during a crash or other sudden deceleration, both readings indicate the entire torso is moving forward in rough agreement with the second integral of the deceleration, then the absence of seat belts may be assumed if the distance the occupant has moved is inconsistent with the expected performance of the seat belt. Similarly, if, during a crash or other sudden deceleration, both readings indicate the entire torso is moving forward less than a free mass would move then the seat belt may be assumed to be functioning. A third possibility that can be ascertained if capacitor electrode 22' is included is that the lower torso is not moving forward like a free body but the upper torso is moving as a free body would move. These indications suggest that the shoulder part of the seat belt is not correctly installed but the lap part is. Knowing the state of the seat belt enables the occupant protection system of the vehicle to deploy the air bags optimally.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. In a vehicle having occupant protection means for protecting an occupant of said vehicle and a microprocessor for controlling said occupant protection means, the improvement comprising:
a vehicle seat comprising sensing means for providing sensor data sufficient with knowledge of the vehicle geometry for calculating the location of a part of an occupant of said seat with respect to a reference frame fixed with respect to the structure of said vehicle, and
means for enabling said sensor data to influence said microprocessor in its said controlling said occupant protection means.

2. The invention as defined by claim 1 wherein said seat comprises a seat back and a seat cushion, and said sensing means comprises:
one or more sensors for providing data enabling the location of said seat back and said seat cushion with respect to said reference frame to be calculated, and
one or more sensors for providing data enabling the location of said part of said occupant of said seat with respect to said seat back and said seat cushion to be calculated, whereby
said sensor data comprises: said data enabling the location of said seat back and seat cushion with respect to said reference frame to be calculated, and said data enabling the location of said part of said occupant of said seat with respect to said seat back and said seat cushion to be calculated.

3. The invention as defined by claim 2 wherein:
said seat is movable on a seat track, and
one of said one or more sensors for providing data enabling the location of said seat back and said seat cushion with respect to said reference frame to be calculated comprises a position sensor for measuring the position of said seat on said seat track.

4. The invention as defined by claim 2 wherein
one of said one or more sensors for providing data enabling the location of said seat back and said seat cushion with respect to said reference frame to be calculated comprises an angle sensor for measuring the recline angle of said seat back.

5. The invention as defined by claim 2 wherein one of said one or more sensors for providing data enabling the location of said part of said seat occupant with respect to said seat back and said seat cushion to be calculated comprises:
a first capacitor electrode, a second capacitor electrode, and
a sensor responsive to the capacitance between said first capacitor electrode and said second capacitor electrode.

6. The invention as defined by claim 2 wherein said one or more sensors for providing data enabling the location of said part of said seat occupant with respect to said seat back and said seat cushion to be calculated comprises:
a first capacitor electrode and a second capacitor electrode electrically insulated from each other,
means for applying an alternating voltage between said first capacitor electrode and said second capacitor electrode, and
a sensor responsive to displacement current between said first capacitor electrode and said second capacitor electrode.

7. The invention as defined by claim 6 wherein
said sensor responsive to displacement current comprises:
a resistor connected so that said displacement current passes through said resistor, and
voltage sensing means responsive to voltage across said resistor.

8. The invention as defined by claim 2 wherein
said one or more sensors for providing data enabling the location of said part of said occupant of said seat with respect to said seat back and said seat cushion to be calculated comprises:
a first sensor for measuring a first distance between the back of said occupant of said seat and a first location on said seat back.

9. The invention as defined by claim 8 wherein said first sensor for measuring a first distance comprises:
a first seat back capacitor electrode in said seat back,
a first seat cushion capacitor electrode in said seat cushion, and
a sensor responsive to capacitance between said first seat back capacitor electrode and said first seat cushion capacitor electrode.

10. The invention as defined by claim 8 wherein:
said one or more sensors for providing data enabling the location of said part of said occupant of said seat with respect to said seat back and said seat cushion to be calculated comprises
a second sensor for measuring a second distance between the back of said occupant of said seat and a second location on said seat back comprising:
a second seat back capacitor electrode in said seat back, and
a sensor responsive to capacitance between said second seat back capacitor electrode and said first seat cushion capacitor electrode in said seat cushion.

11. The invention as defined by claim 10, and including a calculator connected to receive said sensor data, and wherein:
said calculator is adapted to use said first distance to define a first point forward of said seat back,
said calculator is adapted to use said second distance to define a second point forward of said seat back,
said calculator uses said two points to define in said reference frame fixed with respect to the structure of said vehicle a plane surface intersecting said first point and second point and also containing a horizontal line extending transverse to the direction of forward movement of said vehicle, and
said calculator is adapted to use said sensor data to calculate said location of said part of an occupant of said seat by calculating the location of the back of a human having thighs against said seat cushion and a back against said plane surface.

12. The invention as defined by claim 11, and including
a weight sensor responsive to the weight of said seat occupant, and wherein
said calculator is adapted to assume said occupant of said seat is a human having average dimensions of humans having the weight estimated by said weight sensor when human dimensions are relevant to its calculations.

13. The invention as defined by claim 8 wherein said first sensor comprises:
a first emitter for generating a first sound, a first receiver for receiving an echo of said first sound, and a timer for measuring the time between when said first sound is generated and the time when said echo of said first sound is received.

14. The invention as defined by claim 8 wherein
said one or more sensors for providing data enabling the location of said part of said occupant of said seat with respect to said seat back and said seat cushion to be calculated comprises
a second sensor for measuring said first distance, whereby two independent measurements are provided of said first distance between the back of said seat occupant said first location on said seat back.

15. The invention as defined by claim 14 wherein said second sensor for providing second data comprises:
a second emitter for generating a second sound, a second receiver for receiving an echo of said second sound, and a timer for measuring the time between when said second sound is generated and the time when said echo of said second sound is received.

16. The invention as defined by claim 14, and including a calculator connected to receive said sensor data, and wherein:
said calculator is adapted to calculate a first occupant position from one of said two independent measurements,
said calculator is also adapted to calculate a second occupant position from the other of said two independent measurements, and
said calculator is adapted to use said first and second occupant positions when calculating said location of said part of said occupant of said seat with respect to said reference frame.

17. The invention as defined by claim 14, and including a calculator connected to receive said sensor data, and wherein:
said first distance measured by said first sensor is used for said calculating the location of said part of said seat occupant with respect to said seat back and said seat cushion when one of said measurements indicates less than a predetermined distance, and
said first distance measured by said second sensor is used for said calculating the location of said part of said seat occupant with respect to said seat back and said seat cushion when said one of said measurements indicates greater than said predetermined distance.

18. The invention as defined by claim 1, and including a calculator adapted to receive said sensor data, and an accelerometer responsive to deceleration resulting from a crash, and wherein:
said sensor data includes values of said deceleration from said accelerometer and said calculator is also adapted for computing values of the second integral of said deceleration as said crash progresses, and
said calculator is also adapted to calculate said location of a part of said seat occupant, and to use said values of said second integral when said calculating said location of a apart of said occupant of said seat with respect to said reference frame fixed with respect to the structure of said vehicle.

19. The invention as defined by claim 18 wherein:
said calculator comprises means for calculating the velocity of said part of said occupant of said seat with respect to said reference frame fixed with respect to the structure of said vehicle from input comprising said sensor data, and
said calculator is adapted to use said velocity when said calculating said location of a part of said occupant of said seat with respect to said reference frame fixed with respect to the structure of said vehicle.

20. The invention as defined by claim 18, and including a seat belt for restraining an occupant of said seat, and wherein:
said seat belt comprises a latch,
said latch is adapted to provide a seat belt latched signal indicating if said seat belt latch is or is not latched, and
said calculator is adapted to said use said values of said second integral only when said seat belt latched signal indicates said seat belt is not latched.

21. The invention as defined by claim 8, and including a calculator adapted to receive said sensor data, and an accelerometer responsive to deceleration resulting from a crash, and wherein:
said calculator is connected for receiving values of said deceleration from said accelerometer and said calculator is also adapted for computing values of the second integral of said deceleration as said crash progresses, and
said calculator is also adapted to calculate said location of a part of said seat occupant, and to use said values of said second integral when said calculating said location of a part of said occupant of said seat with respect to said reference frame fixed with respect to the structure of said vehicle.

22. The invention as defined by claim 18 wherein:
said calculator comprises means for calculating the velocity of said occupant of said seat with respect to said reference frame fixed with respect to the structure of said vehicle, and
said calculator is adapted to transmit said velocity to said microprocessor.

23. The invention as defined by claim 8 wherein
said one or more sensors for providing data enabling the location of said part of said occupant of said seat with respect to said seat back and said seat cushion to be calculated comprises
a second sensor for measuring a second distance between the back of said seat occupant and a second location on said seat back, and wherein:
said calculator is adapted to use said first distance and said second distance to define two points in a reference frame fixed with respect to the structure of said vehicle,
said two points define a plane surface containing said two points and a horizontal line extending transverse to the direction of forward movement of said vehicle, and
said calculator calculates said location of a part of an occupant of said seat with respect to a reference frame fixed with respect to the structure of said vehicle to be the location of the torso of a human having thighs against said seat cushion and a back against said plane surface.

24. In a vehicle having occupant protection means for protecting an occupant of said vehicle and a microprocessor for controlling said occupant protection means, the improvement comprising:
a vehicle seat comprising a seat back, a seat cushion, and an occupant sensor responsive to distance from a location on said seat to a location on said occupant by producing a first signal categorizing an occupant of said seat into one of at least three categories, and wherein
said microprocessor is responsive to said first signal when controlling said occupant protection means.

25. The invention as defined by claim 24 wherein said occupant sensor comprises:
a first capacitor electrode, a second capacitor electrode, and a sensor responsive to the capacitance between said first capacitor electrode and said second capacitor electrode.

26. The invention as defined by claim 24 wherein said occupant sensor comprises:
   a first capacitor electrode and a second capacitor electrode electrically insulated from each other,
   means for applying an alternating voltage between said first capacitor electrode and said second capacitor electrode, and
   a sensor responsive to displacement current between said first capacitor electrode and said second capacitor electrode.

27. The invention as defined by claim 26 wherein said sensor responsive to displacement current is responsive to both the magnitude and phase of said displacement current relative to the magnitude and phase of said alternating voltage, whereby
   said occupant sensor is responsive to both the magnitude and Q of capacitance between said capacitor electrodes.

28. The invention as defined by claim 26 wherein said sensor responsive to displacement current comprises:
   a resistor connected so that said displacement current passes through said resistor, and
   voltage sensing means responsive to voltage across said resistor.

29. The invention as defined by claim 24, and including
   a second occupant sensor responsive to distance from a second location on said seat to a second location on an occupant by producing a second signal, and wherein
   said microprocessor is responsive to said first signal and said second signal when controlling said occupant protection means.

30. The invention as defined by claim 24 wherein
   said categorizing an occupant of said seat into one of at least three categories is into categories of occupant position.

31. In a vehicle having occupant protection means for protecting an occupant of said vehicle and decision making means for controlling said occupant protection means, the improvement comprising:
   a vehicle seat comprising capacitor electrodes,
   seat occupant categorizing means for categorizing an occupant of said seat into one of at least three categories, and
   means for transmitting said category to said decision making means and wherein
   said seat occupant categorizing means is responsive to capacitance between said capacitor electrodes when said categorizing.

32. The invention as defined by claim 31 wherein said seat occupant categorizing means is responsive to both the magnitude and Q of said capacitance between said capacitor electrodes.

33. The invention as defined by claim 31 wherein said seat comprises a seat back and a seat cushion, and
   said capacitor electrodes comprise a seat back capacitor electrode in said seat back and a seat cushion capacitor electrode in said seat cushion.

34. The invention as defined by claim 31 wherein:
   said seat comprises a capacitor comprising a first said capacitor electrode and a second said capacitor electrode,
   said seat occupant categorizing means causes displacement current to flow through said capacitor by applying an alternating voltage between said first said capacitor electrode and said second said capacitor electrode, and
   said seat occupant categorizing means is responsive to said displacement current when said categorizing said occupant of said seat into said one of at least three categories.

35. The invention as defined by claim 31 wherein:
   said seat occupant categorizing means causes displacement current to flow between said capacitor electrodes, and
   said seat occupant categorizing means is responsive to said displacement current by said categorizing said occupant of said seat into said one of at least three categories.

36. The invention as defined by claim 35 wherein:
   said seat comprises a capacitor comprising a first said capacitor electrode and a second said capacitor electrode,
   said seat occupant categorizing means causes displacement current to flow through said capacitor by applying an alternating voltage between said first said capacitor electrode and said second said capacitor electrode, and
   said seat occupant categorizing means is responsive to both the magnitude and phase of said displacement current relative to said alternating voltage when said categorizing said occupant of said seat into one of at least three categories, whereby
   said seat occupant categorizing means is responsive to both the magnitude and Q of said capacitor.

37. The invention as defined by claim 35 wherein said seat occupant categorizing means comprises
   current sensing means for providing a measurement of said displacement current, and wherein
   said occupant categorizing means is responsive to said measurement of said displacement current when said categorizing said occupant of said seat into said one of at least three categories.

38. In a vehicle having occupant protection means for protecting an occupant of said vehicle and decision making means for controlling said occupant protection means, the improvement comprising:
   a vehicle seat comprising capacitor electrodes,
   means for causing displacement current to flow between said capacitor electrodes,
   means responsive to said displacement current by categorizing an occupant of said seat into one of at least three categories, and
   means for transmitting said category to said decision making means.

39. The invention as defined by claim 38 wherein said seat occupant categorizing means is responsive to both the magnitude and phase of said displacement current, whereby
   said occupant categorizing means is responsive to both the magnitude and Q of said capacitance between said capacitor electrodes.

40. The invention as defined by claim 38 wherein:
   said seat comprises a first capacitor electrode and a second capacitor electrode, and
   said means for causing displacement current comprises means for applying an alternating voltage between said first capacitor electrode and said second capacitor electrode.

41. The invention as defined by claim 38 wherein said seat comprises a seat back and a seat cushion, and said capacitor electrodes comprise a seat back capacitor electrode in said seat back and a seat cushion capacitor electrode in said seat cushion.

42. The invention as defined by claim 38 wherein a said capacitor electrode comprises fabric which has been adapted to be electrically conductive.

43. The invention as defined by claim 38 wherein said seat occupant categorizing means comprises:

a resistor connected so that said displacement current passes through said resistor, and said means responsive to said displacement current is responsive to voltage across said resistor by said categorizing an occupant of said seat into one of at least three categories.

44. The invention as defined by claim 38 wherein said categorizing an occupant of said seat into one of at least three categories is into categories of occupant position.

* * * * *